Figure 1:
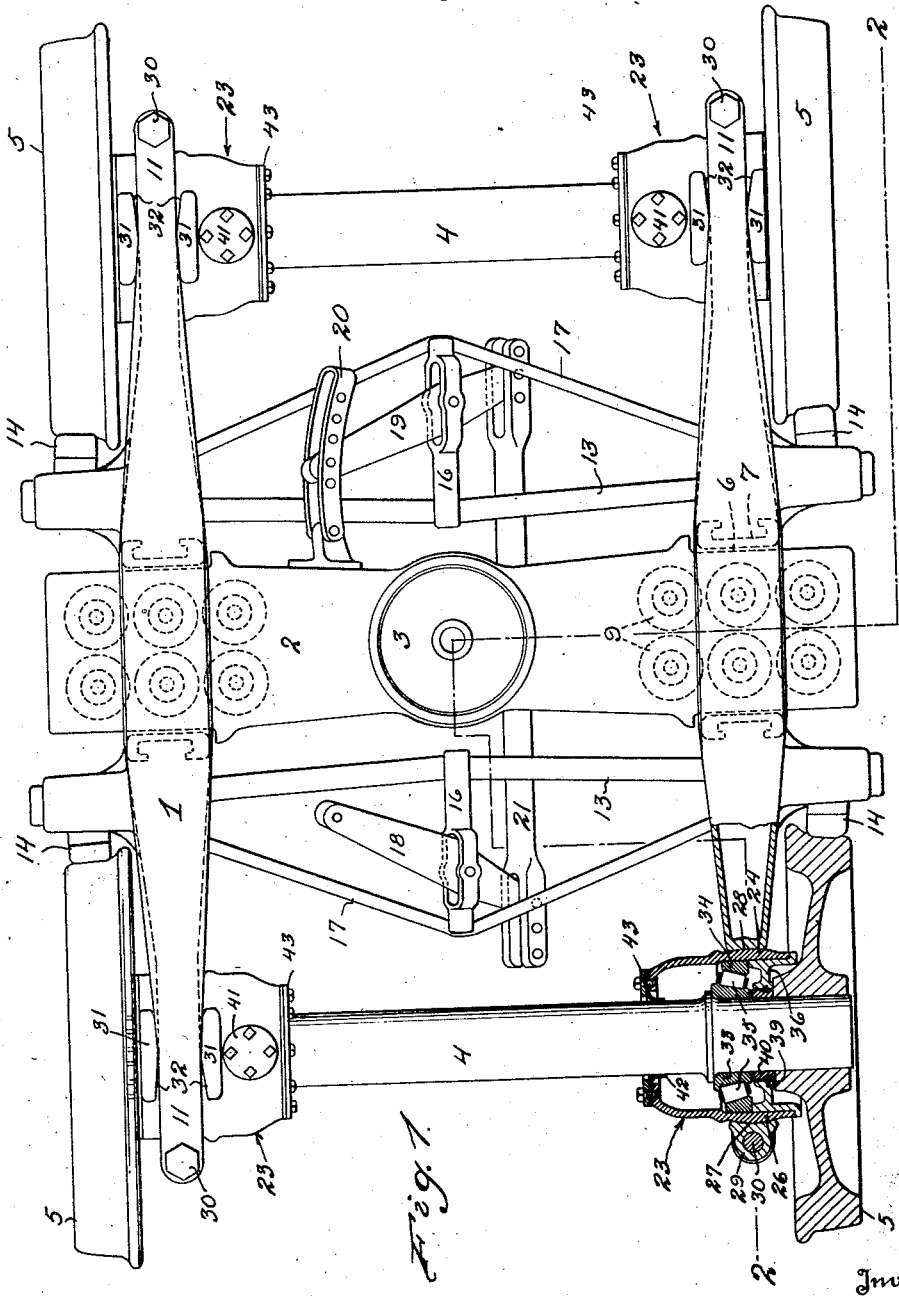

Nov. 15, 1927.  
D. S. BARROWS  
INBOARD CAR TRUCK  
Filed Sept. 19, 1927  
1,649,377  
3 Sheets-Sheet 1

Inventor  
Donald S. Barrows  
By  
his Attorney

Nov. 15, 1927. 1,649,377
D. S. BARROWS
INBOARD CAR TRUCK
Filed Sept. 19, 1927 3 Sheets-Sheet 2
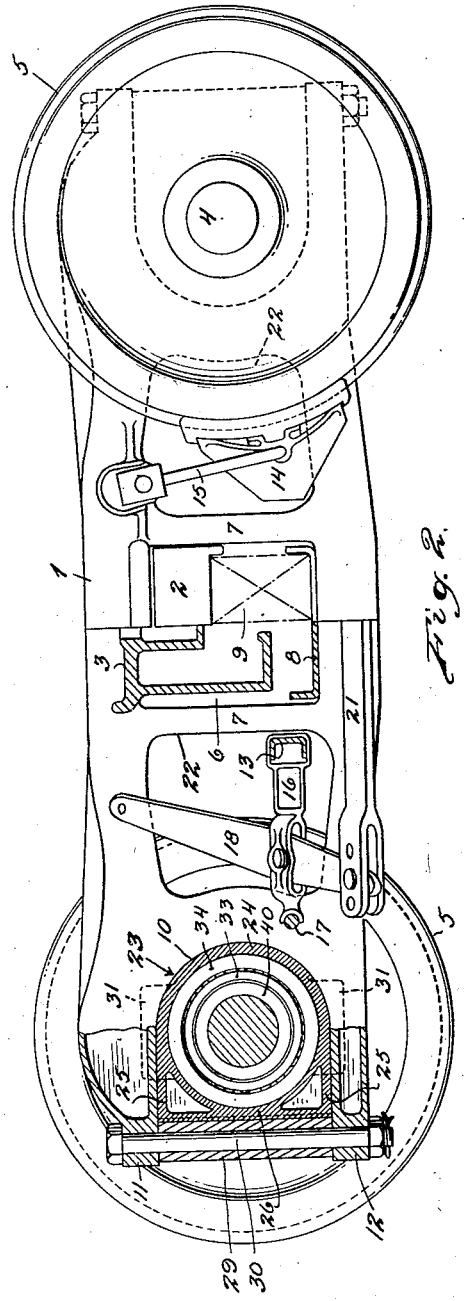
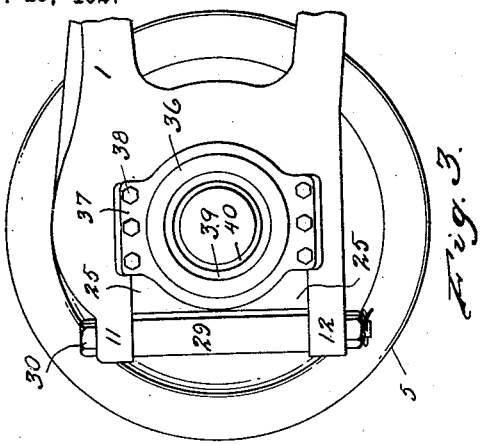
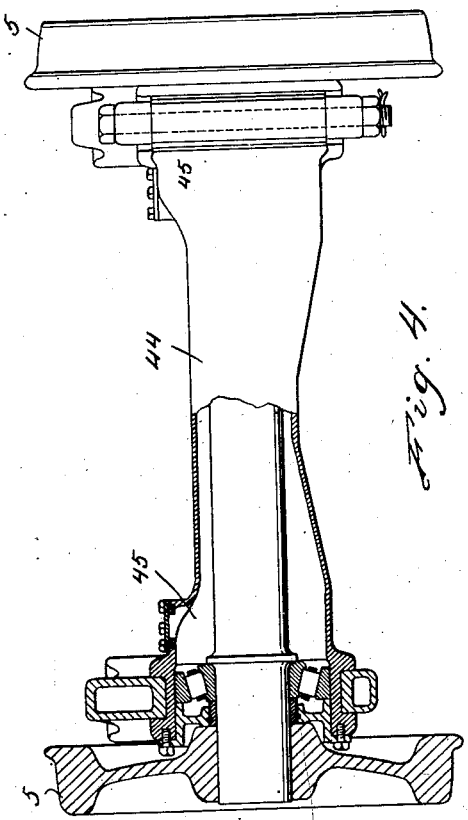
Inventor
Donald S. Barrows
By
his Attorney

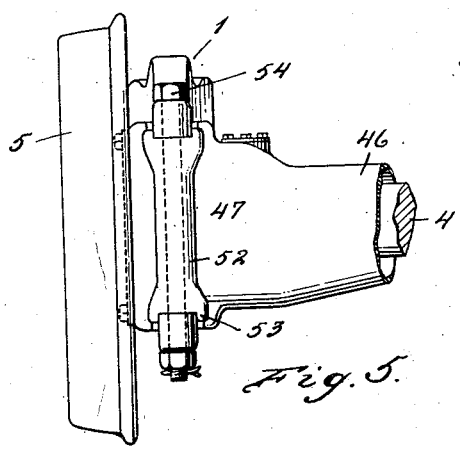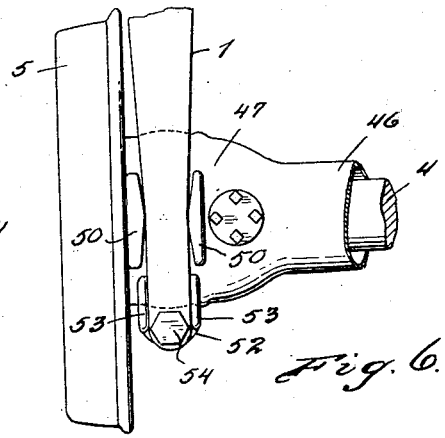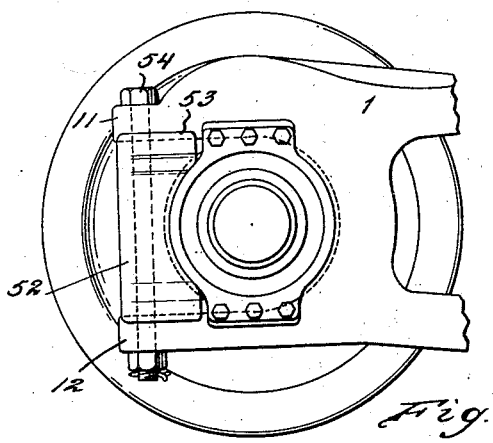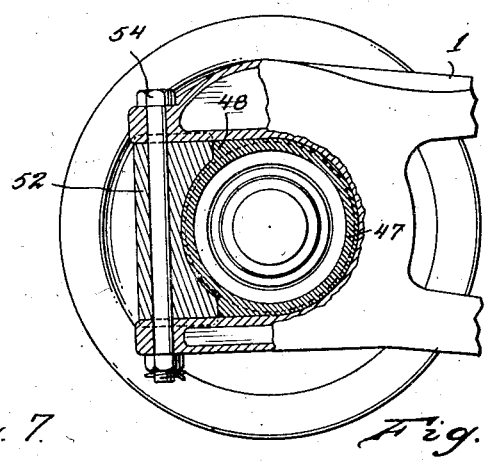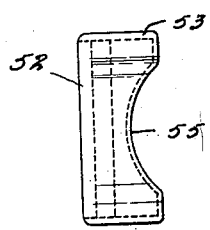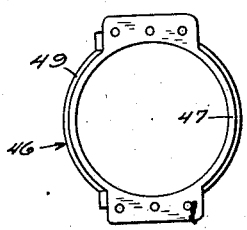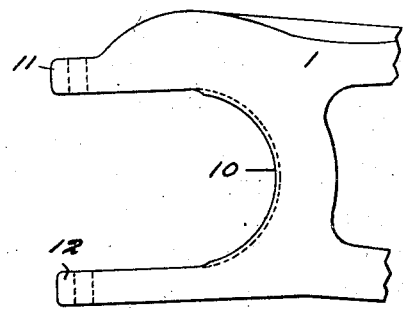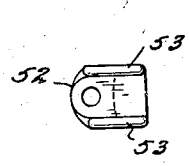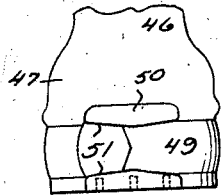

Patented Nov. 15, 1927.

1,649,377

UNITED STATES PATENT OFFICE.

DONALD S. BARROWS, OF ROCHESTER, NEW YORK.

INBOARD CAR TRUCK.

Application filed September 19, 1927. Serial No. 220,354.

The invention relates to railway trucks and has special reference to those of the so called inboard type or in which the side frames are located inwardly of the wheels.

The principal object of the invention, generally stated, is to provide an inboard type truck of such construction that the axles and boxes therefor are removable from the truck endwise thereof in contradistinction to the usual mounting in which the trucks must be jacked up to permit removal of the axles and boxes.

A more specific object of the invention is to provide a truck of the inboard type in which the side frames are provided with jaws opening out at the ends, the journal boxes, or housings as the case may be, being mounted within the jaws and engageable therein or removable therefrom by movement in a substantially horizontal direction endwise of the truck.

An important object of the invention is to provide a truck of this character in which the axles are mounted optionally within boxes or within housings having their ends formed as or resembling boxes, the boxes, or the ends of the housings as the case may be, being detachably held within the jaws of the side frames.

Another important object of the invention is to provide a truck of this character in which the boxes or housing ends, as the case may be, have such engagement with the side frames as to have lateral clearance and be therefore capable of limited rocking movement to relieve the truck parts of any racking strain which might otherwise come upon them, the wheels and axles being able to accommodate themselves to different track conditions.

Another object of the invention is the provision of a truck of this character in which the journal boxes or axle housing ends are preferably provided with roller bearings which will increase the freedom of movement by reducing friction in the well known manner.

A further object of the invention is to provide a truck of this character in which the side frames are provided with openings of such size and shape and in such locations as to permit extension of the brake beams therethrough and movement of the brake beams to engage the shoes thereon with the wheels which are of course located outwardly of the side frames, as the brake mechanism is actuated, it being, however, unnecessary to provide any special brake structure as one of standard pattern may be employed.

An additional object of the invention is to provide a truck of this type which will be comparatively simple and inexpensive to manufacture, which may be integral in construction, and which will moreover be readily capable of assembly or disassembly as occasion may demand in addition to being efficient and durable in service and a general improvement in the art.

To the attainment of the foregoing and other objects and advantages, the invention preferably consists in the details of construction and the arrangement and combination of parts to be hereinafter more fully described and claimed, and illustrated in the accompanying drawings in which:

Figure 1 is a plan view of a truck constructed in accordance with the invention, one wheel and journal box and the adjacent end of one side frame being shown in section, Figure 2 is a view of the truck partly in side elevation and partly in section, taken substantially on the line 2—2 of Figure 1, Figure 3 is a side elevation of one end of one side frame the wheel being removed, Figure 4 is an end elevation of the truck illustrating a modification in which the separate boxes are replaced by an axle housing having box-like end portions, one wheel, the adjacent portion of the side frame and one end portion of the housing being shown in section, Figure 5 is a fragmentary end elevation showing another modification, Figure 6 is a top plan view of what is disclosed in Figure 5, Figure 7 is a fragmentary side elevation of one side frame showing this modified mounting, Figure 8 is a somewhat similar view with the major portion in section, Figure 9 is a fragmentary detail elevation of a side frame showing only one end thereof, Figure 10 is a detail view of the jaw closure member, Figure 11 is a top plan view of the jaw closure member, Figure 12 is an end elevation of an axle housing member, and Figure 13 is a fragmentary plan view thereof.

Referring more particularly to the drawings and especially Figures 1 to 3 inclusive, I have shown the truck as comprising side frames indicated generally by the numeral 1, a truck bolster 2 having the usual or any preferred center bearing 3 and axles 4 carrying wheels 5. The side frames 1 are preferably of the integral type so as to be capable of formation by casting, this being a convenient and simple method of construction. The side frames are represented as provided centrally with window openings 6 defined between guides 7 and receiving the ends of the bolster 2 in a well known manner, a spring plank 8 being preferably provided at the bottom of the window openings to serve as a seat for the usual truck springs diagrammatically illustrated at 9, it being obvious that any ordinary or preferred type of springs may be employed.

Whereas it is generally the custom to provide journal box openings or jaws which open at the underside of the side frames, it is an important feature of my invention to provide the side frames with openings 10 opening out at the ends, the openings being defined between upper and lower jaws 11 and 12. While it is conceivable that the openings might be of different shape I have shown them as having their inner portions semicylindrical with the confronting faces of the jaws parallel and horizontal.

The truck is disclosed as equipped with a standard brake mechanism including brake beams 13 carrying brake shoes 14 and supported by hangers 15, the beams being provided with clevises 16 and being, together therewith, braced by truss rods 17, as is a common practice. The live lever 18 is pivoted in one clevis while pivoted in the other is the usual dead lever 19 adjustably mounted within a guide bracket 20 of ordinary type, and the lower ends of the levers are connected by the usual forked connecting rod 21. There is nothing characteristic about this brake mechanism though it is shown and described for the reason that the brake beams and truss rods must extend beyond the side frames as the truck is of the inboard type, and the side frames are therefore provided with openings 22 of such size, shape and location as to permit passage of the brake beams and truss rods and the necessary movement thereof from effective to ineffective position. These openings of course also act to reduce the weight.

In this form of the invention I provide a species of journal box indicated generally at 23 at each end of each side frame for the purpose of supporting the axles therein. Each of these boxes is of such shape and size as to fit within the side frame opening 10, it being preferable that the box conform to the shape of the opening by having a cylindrical portion 24 and laterally extending portions 25, the latter having their upper and lower faces parallel and engaging against the confronting faces of the jaws 11 and 12. By this simple arrangement the boxes will be prevented from turning within the side frame openings or between the jaws. The extending portions 25 may be hollow or solid as preferred though the former construction is illustrated and is of benefit in effecting a reduction in weight. The outer wall 26 of each box, that is to say the wall nearest the end of the side frame is preferably vertical and may be somewhat convexed as indicated at 27. The cylindrical inner portion 24 may also have its outer surface convexed as indicated at 28. The means for retaining the various boxes in position may conveniently comprise a closure member 29 extending between the jaws 11 and 12 and secured as by a vertical bolt 30 or its equivalent. The member 29 is preferably concaved on its inner face to conform to the convex surface 27 of the vertical wall portion 26 of the box.

To prevent any shifting of the boxes out of place laterally of the side frames, each box is preferably provided at its top and bottom with spaced lugs 31 which are disposed against the outer and inner faces of the side frames at the jaw portions thereof. It is of course highly desirable that there be a certain limited movement of the axles and boxes with respect to the side frames so as to permit the axles and wheels to accommodate themselves to different track conditions without bringing any undue strains or stresses upon the various truck parts and for this reason the confronting faces of the pairs of lugs 31 are represented as beveled off or inclined outwardly away from the side frames from points at substantially the centers of the lugs so as to provide a limited clearance which will permit the lateral rocking. These inclined or beveled surfaces are indicated at 32. The convexing of the outer surfaces of the boxes and the corresponding concaving of the retainer 29 and opening wall 28 contribute toward the freedom of movement and it will be apparent that as tilting occurs the retainers 29 may pivot slightly about the bolts 30.

While it is conceivable that the journal boxes 23 may have an internal construction more or less similar to that provided in boxes of ordinary pattern, I prefer that these boxes be provided interiorly with roller bearing structures for the purpose of reducing friction. Each roller bearing structure is disclosed as including inner and outer ring members 33 and 34 fixed respectively upon the axle and within the box and having located between them any desired number of rollers 35 which are preferably frusto-conical in shape for facilitating adjustment, the intention being that the outer ring member in each instance be engaged by a combined closure and adjusting plate 36 having extensions 37 bolted at 38 onto the outer face of the side frame. Each plate 36 has what may be termed a hub portion 39 slidably engaged upon a sleeve 40 surrounding the journal end of the axle, suitable packing means being interposed to prevent oil leakage. While the details of the roller bearing structures are disclosed to a considerable extent it should be understood that I do not propose to be unduly limited as any equivalent structure might be used to equal advantage. A box of this type is intended to be maintained partially full of lubricant such as oil and the box is therefore represented as having a hand hole normally closed by a removable cover plate 41, this hole being provided for the purpose of facilitating the introduction of additional lubricant as the supply needs replenishing. It is also necessary to prevent leakage of the lubricant by creeping thereof along the axles and for this reason each box is disclosed as having its inner end provided with a flexible washer 42 held in place as by a clamping plate or ring 43, this washer embracingly engaging the axle very snugly and acting as a seal. It should of course be understood that any other equivalent packing may be used as no claim is made to this detail.

In Figure 4 I have illustrated a slight modification in which the structure is identically the same as that above described except that instead of providing the separate boxes 23, I provide a housing 44 having its end portions 45 formed in identically the same manner as the boxes 23 and similarly mounted in the side frames. In this instance the washers 42 and clamping plates 43 are of course not present on account of the integrality of the structure.

In Figures 5 to 13 inclusive I have illustrated additional modifications in regard to the details of construction, the general features being however the same as in the forms above described. In these figures the side frame is disclosed as of identically the same form as that above described and having the same jaw arrangement for receiving the axle boxes or housings, as the case may be. As a matter of fact, Figures 5, 6, 7, 8 and 13 show an axle housing 46 almost identical in construction with the corresponding housing 44 shown in Figure 4 and having end portions 47 corresponding to the end portions 45 or to the boxes 10 except that the vertical wall 26 above described is not present in this modification, the end portion 47 of the housing 46 being almost entirely circular in cross section, there being only comparatively small top and bottom projections 48 with flat surfaces conformingly engaging against the confronting faces of the jaws. The roller bearing structure and adjusting means therefor may be identically the same as above described. It should probably be mentioned that each end portion 47 is preferably formed with a spherically curved band-like area 49 at that portion received within the side frame and also the portion engaged with the combined jaw closure and housing retaining means to be described. Each end portion of each housing is provided with the upstanding and downwardly extending lugs 50 corresponding to the previously described lugs 31, these lugs being similarly beveled as indicated at 51 on their confronting faces.

Whereas the first and second forms of the invention shown in Figures 1 to 4 inclusive disclosed the jaw closure and retaining member 29 capable of movement between the jaws, Figures 5, 6, 7, 8, 10 and 11 disclose a corresponding member 52 having spaced pairs of ribs 53 at its upper and lower ends embracingly engaging the jaws so that the member 52 will be incapable of movement when secured by the vertical bolt 54 provided for the purpose. The member 52 has a curved face 55 which is arcuate for conforming engagement with the housing end 47 and this face is transversely concaved to conform to the spherically curved band or area 49 on the housing end. It will be noted that the jaw opening in the side frame is similarly concaved as described in connection with Figures 1 to 3 and the effect of concaving the curved wall of the jaw opening and the curved face 55 of the closure member 52 to conform to the spherically curved band on each housing end will be to define a ball and socket connection which will permit the axle housing to tilt laterally or out of a position perpendicular to the faces of the side frames to enable the axles and wheels to follow variations in track conditions without binding. It is conceivable that this detail might be omitted by providing a certain amount of looseness in the fit of the parts but the structure described is preferable as permitting the play or movement without looseness with the resultant hammering. It is clear that the detailed construction of the retaining member 52 while described and shown in conjunction with an axle housing may be applied to equal advantage to a journal box constructed to resemble the end portion of the housing, this and other variations being readily possible.

In all the forms of the invention it will be readily apparent that whenever it is necessary to remove the axle and journal boxes or axle housings, this may be done very readily by jacking up the truck to a sufficient extent to relieve the weight on the wheel, whereupon the bolts 30 or 54 may be removed, the retainers 26 or 52 taken out, and the journal boxes or axle housing slid out of the truck by outward movement endwise of the side frames. Reassembling is effected in the reverse manner. Clearly it will not be necessary to disturb any other portions of the structure and the work of making repairs or replacements will consequently be greatly simplified. It is believed that the construction, operation and advantages will be readily apparent to one skilled in the art without further explanation.

While I have shown and described preferred embodiments of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a car truck, the combination with the truck wheels, of side frames positioned between the same, axles connecting each pair of wheels, housing members for said axles, and means for connecting said housing members to said side frames, said means permitting the removal of said wheels in the normal position of said side frames.

2. In a car truck, the combination with the truck wheels, of side frames positioned between the same, axles connecting each pair of wheels, housing members for said axles, and means for connecting said housing members to said side frames, said means permitting the removal of said wheels in the normal position of said side frames, said housing members being capable of limited rocking movement with respect to the side frames.

3. In a car truck, the combination of side frames provided with openings extending out through the ends, a truck bolster mounted within the side frames and bridging the space therebetween, axles carrying wheels, the latter being located outwardly of the side frames, and housing members engaged upon the axles and received within said openings and capable of removal therefrom endwise of the side frames in the substantially normal position thereof.

4. In a car truck, the combination of side frames provided with openings extending out through the ends, a truck bolster mounted within the side frames and bridging the space therebetween, axles carrying wheels, the latter being located outwardly of the side frames, housing members engaged upon the axles and received within said openings and capable of removal therefrom endwise of the side frames in the substantially normal position thereof, and retaining means bridging said openings beyod the housing members.

5. In a car truck, the combination of side frames provided with openings extending out through the ends, a truck bolster mounted within the side frames and bridging the space therebetween, axles carrying wheels, the latter being located outwardly of the side frames, housing members engaged upon the axles and received within said openings and capable of removal therefrom endwise of the side frames in the substantially normal position thereof, and retaining means bridging said openings beyond the housing members, said housing members being mounted for limited rocking movement with respect to the side frames.

6. In a car truck, the combination of side frames provided with openings extending out through the ends, a truck bolster mounted within the side frames and bridging the space therebetween, axles carrying wheels, the latter being located outwardly of the side frames, housing members engaged upon the axles and received within said openings and capable of removal therefrom endwise of the side frames in the substantially normal position thereof, and retaining means bridging said openings beyond the housing members, said housing members having portions thereon embracing portions of the side frames and tiltable with respect thereto.

7. In a car truck, the combination of side frames provided with openings extending out through the ends, a truck bolster mounted within the side frames and bridging the space therebetween, axles carrying wheels, the latter being located outwardly of the side frames, housing members engaged upon the axles and received within said openings and capable of removal therefrom endwise of the side frames in the substantially normal position thereof, and retaining means bridging said openings beyond the housing members, said housing members having portions thereon embracing portions of the side frames and tiltable with respect thereto in a horizontal plane.

8. In a railway truck, the combination of side frames formed with openings extending to the ends and defining jaws, axles carrying wheels located outwardly of the side frames, housing members on the axles fitting within said openings and removable therefrom in the substantially normal position of the side frames by movement endwise thereof, and means within the openings and connected with said jaws for retaining said housing members in position.

9. In a railway truck, the combination of side frames formed with openings extending to the ends and defining jaws, axles carrying wheels located outwardly of the side frames, housing members on the axles fitting within said openings and removable therefrom in the substantially normal position of the side frames by movement endwise thereof, and means within the openings and connected with said jaws for retaining said housing members in position, the housing members having a species of ball and socket engagement with the side frames and retaining means to be capable of tilting movement with respect to the side frames.

10. In a railway truck, the combination of side frames formed with openings extending to the ends and defining jaws, axles carrying wheels located outwardly of the side frames, housing members on the axles fitting within said openings and removable therefrom in the substantially normal position of the side frames by movement endwise thereof, and means within the openings and connected with said jaws for retaining said housing members in position, the housing members having a species of ball and socket engagement with the side frames and retaining means to be capable of tilting movement with respect to the side frames, said housing members having portions embracingly engaging the jaws to prevent longitudinal shifting of the axles and housing members.

11. In a railway truck, the combination of side frames formed with openings extending to the ends and defining jaws, axles carrying wheels located outwardly of the side frames, housing members on the axles fitting within said openings and removable therefrom in the substantially normal position of the side frames by movement endwise thereof, and means within the openings and connected with said jaws for retaining said housing members in position, the housing members having a species of ball and socket engagement with the side frames and retaining means to be capable of tilting movement with respect to the side frames, said housing members having portions embracingly engaging the jaws to prevent longitudinal shifting of the axles and housing members, said jaw engaging portions being beveled to avoid interference with said tilting movement.

12. In a car truck, the combination with the truck wheels, of side frames positioned between the same, axles connecting each pair of wheels, housing members for said axles, means for connecting said housing members to said side frames, said means permitting the removal of said wheels in the normal position of said side frames, and brake mechanism including brake beams carrying shoes engageable with the wheels, the side frames having openings permitting extension and movement of the brake beams therethrough.

In testimony whereof I affix my signature.

DONALD S. BARROWS.